United States Patent
Liu et al.

(10) Patent No.: US 8,775,142 B2
(45) Date of Patent: Jul. 8, 2014

(54) STOCHASTIC DOWNSCALING ALGORITHM AND APPLICATIONS TO GEOLOGICAL MODEL DOWNSCALING

(75) Inventors: Yongshe Liu, Houston, TX (US); Patrick M. Wong, Houston, TX (US)

(73) Assignee: ConocoPhillips Company, Houston, TX (US)

( * ) Notice: Subject to any disclaimer, the term of this patent is extended or adjusted under 35 U.S.C. 154(b) by 623 days.

(21) Appl. No.: 13/028,811

(22) Filed: Feb. 16, 2011

(65) Prior Publication Data

US 2011/0282635 A1 Nov. 17, 2011

Related U.S. Application Data

(60) Provisional application No. 61/334,653, filed on May 14, 2010.

(51) Int. Cl.
G06G 7/48 (2006.01)
G06G 7/60 (2006.01)

(52) U.S. Cl.
USPC .................................. 703/10; 703/2

(58) Field of Classification Search
USPC ......................................... 703/2, 10
See application file for complete search history.

(56) References Cited

U.S. PATENT DOCUMENTS

| | | | |
|---|---|---|---|
| 5,539,704 A * | 7/1996 | Doyen et al. | 367/73 |
| 5,995,906 A * | 11/1999 | Doyen et al. | 702/16 |
| 6,370,491 B1 | 4/2002 | Malthe-Sorenssen et al. | |
| 6,662,109 B2 | 12/2003 | Roggero et al. | |
| 6,662,147 B1 * | 12/2003 | Fournier et al. | 703/10 |
| 6,826,520 B1 | 11/2004 | Khan et al. | |
| 6,980,940 B1 | 12/2005 | Gurpinar et al. | |
| 7,254,091 B1 * | 8/2007 | Gunning et al. | 367/73 |
| 7,451,066 B2 | 11/2008 | Edwards et al. | |
| 7,788,074 B2 * | 8/2010 | Scheidt et al. | 703/10 |
| 2006/0058965 A1 | 3/2006 | Ricard et al. | |
| 2006/0149520 A1 | 7/2006 | Le Ravalec-Dupin et al. | |
| 2007/0055447 A1 | 3/2007 | Mickaele et al. | |
| 2009/0043555 A1 | 2/2009 | Busby et al. | |
| 2009/0070086 A1 | 3/2009 | Le Ravalec et al. | |

OTHER PUBLICATIONS

Gunning and Glinsky, Delivery: an open-source model-based Bayesian seismic inversion program, 2004, Computers & Geosciences 30 (6), pp. 619-636.*

Gallop and Couzens, Prestack geostatistical fold matching to improve 4D images, 2009, pp. 3805-3809.*

Yongshe Liu, "Geostatistical Integration of Linear Coarse Scale and Fine Scale Data", A Dissertation Submitted to the Department of Petroleum Engineering and the Committee on Graduate Studies of Stanford University, Aug. 2007, 229 pages.

Yongshe Liu and Patrick M. Wong, "New Stochastic Downscaling Algorithm and Applications to Ugnu and Surmont SAGD Geomodeling" Geomodeling, Subsurface Technology, Feb. 2009, 34 pages.

(Continued)

*Primary Examiner* — Kamini S Shah
*Assistant Examiner* — Juan Ochoa
(74) *Attorney, Agent, or Firm* — ConocoPhillips Company

(57) ABSTRACT

A computer-aided method of downscaling a three-dimensional geological model by generating numerical stochastic fine-scale models conditioning to data of different scales and capturing spatial uncertainties which involves a downscaling algorithm.

16 Claims, 8 Drawing Sheets

(56) References Cited

OTHER PUBLICATIONS

Weishan Ren, Jason A. McLennan, Luciane B. Cunha and Clayton V. Deutsch, "An Exact Downscaling Methodology in Prescence of Heterogeneity: Application to the Athabasca Oilsands", SPE/PS-CIM/CHOA 97874, 2005, 8 pages.

Thomas T. Tran, Xian-Huan Wen, Ronald A. Behrens, Efficient Conditioning of 3D Fine-Scale Reservoir Model to Multiphase Production Data Using Streamline-Based Coarse-Scale Inversion and Geostatistical Downscaling, Dec. 2001 SPE Journal, pp. 364-374.

Yongshe Liu, Andre G. Journel, "A Package for Geostatistical Integration of Coarse and Fine Scale Data", Department of Energy Resources Engineering, Computers & Geosciences 35, 2009, pp. 527-547.

Thomas Mejer Hansen, Klaus Mosegaard, "VISIM: Sequential Simulation for Linear Inverse Problems", Computers & Geosciences 34, 2008, pp. 53-76.

Mathematical Geology, vol. 33, No. 8, Nov. 2001, "Direct Sequential Simulation and Cosimulation", pp. 911-926.

\* cited by examiner

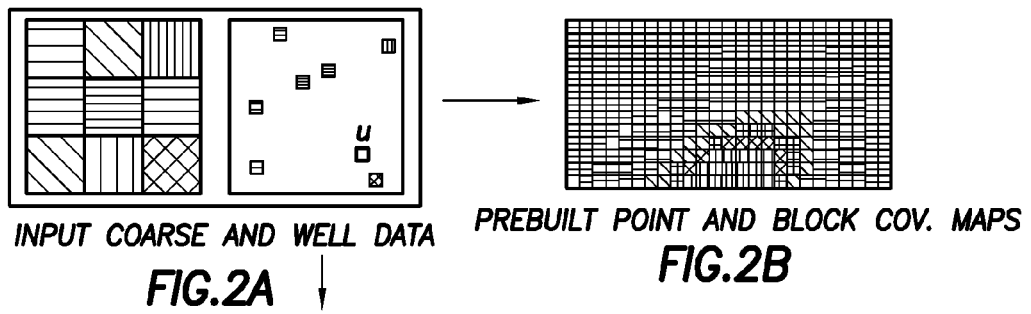

FIG.2A INPUT COARSE AND WELL DATA

FIG.2B PREBUILT POINT AND BLOCK COV. MAPS

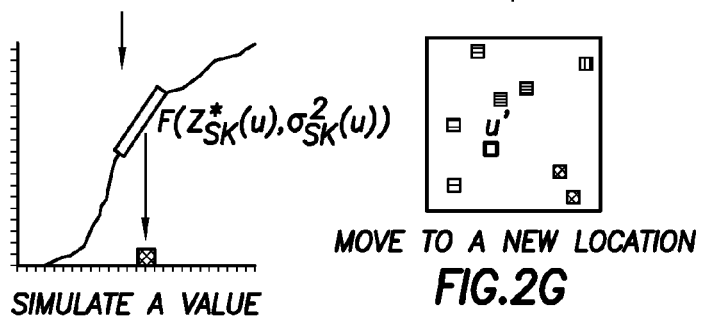

$$\begin{bmatrix} C_{PP} & \overline{C}_{PB} \\ \overline{C}_{BP} & \overline{C}_{BB} \end{bmatrix} \cdot \begin{bmatrix} \lambda_P \\ \lambda_B \end{bmatrix} = \begin{bmatrix} C_{P_0P} \\ \overline{C}_{P_0B} \end{bmatrix}$$

KRIGING SYSTEM
FIG.2C $Z^*_{SK}(u) \quad \sigma^2_{SK}(u)$

COMPUTE MEAN & VAR.
FIG.2D $F(Z^*_{SK}(u), \sigma^2_{SK}(u))$

SIMULATE A VALUE
FIG.2E

MOVE TO A NEW LOCATION
FIG.2G

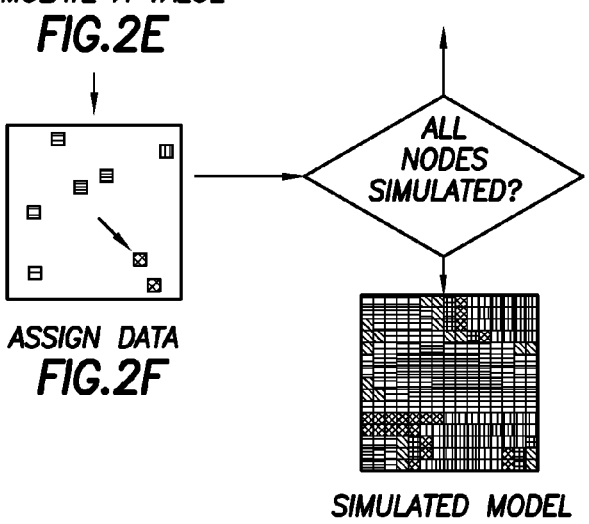

ASSIGN DATA
FIG.2F

ALL NODES SIMULATED?

SIMULATED MODEL

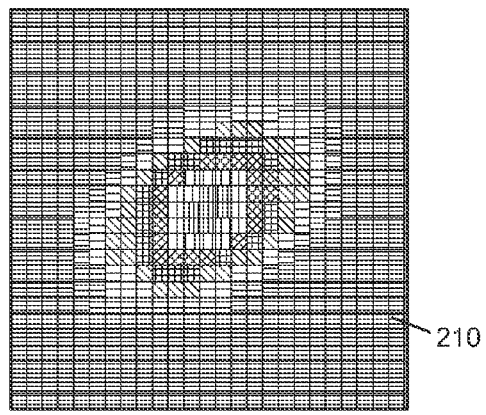 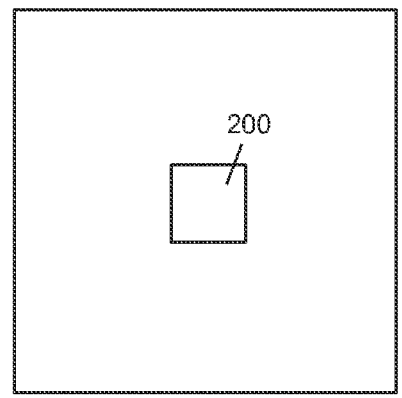
FIG.4A    FIG.4B
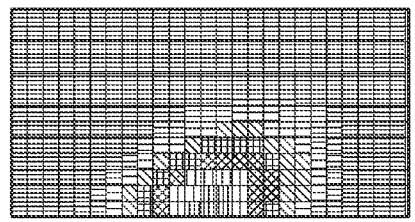 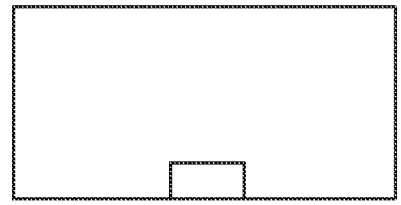
FIG.4C    FIG.4D
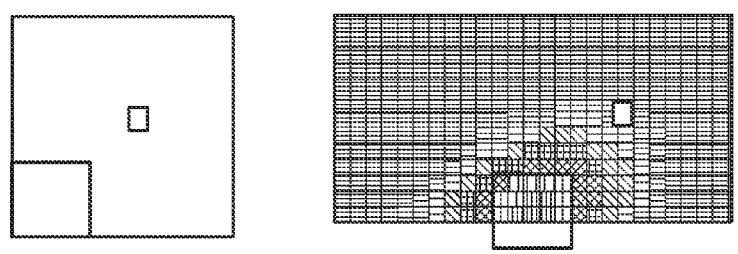
FIG.6

STOCHASTIC DOWNSCALING ALGORITHM AND APPLICATIONS TO GEOLOGICAL MODEL DOWNSCALING

CROSS-REFERENCE TO RELATED APPLICATIONS

This application claims priority benefit under 35 U.S.C. Section 119(e) to U.S. Provisional Patent Ser. No. 61/334,653 filed on May 15, 2010 the entire disclosure of which is incorporated herein by reference.

FIELD OF THE INVENTION

The present invention relates generally to methods for geological modeling. More particularly, but not by way of limitation, embodiments of the present invention include methods for downscaling geological property models.

BACKGROUND OF THE INVENTION

Geological models, such as petroleum reservoir geological models, are often utilized by computer systems for simulation. For example, computer systems may utilize petroleum reservoir geologic models to simulate the flow and location of hydrocarbons within a reservoir. Geological models are typically formed utilizing thousands or millions of geologic cells, with each cell corresponding to a location and a physical geologic or petrophysical property. The number of cells or cell size in a model is generally determined by the computing capabilities of geomodeling packages or flow simulator and the level of heterogeneity geomodelers want to capture.

Accurate reservoir performance forecasting requires three-dimensional representation of the geological model. The geological model is commonly built with the use of well and seismic data and stochastic simulation techniques. Simulated rock property values are filled in the three-dimensional cells constructed at a given scale. Cell dimensions are changed according to the needs of flow simulation. The cells can be "upscaled" into larger ("coarser") cells, "downscaled" into smaller ("finer") cells or a combination thereof.

Conventional downscaling methods typically resample the property values from coarse grids to fine grids, which gives the same property value of all fine-grid cells located in the same coarse grid. Sharp changes can be commonly created across the coarse grid boundaries. For example, when a coarse grid model with four cells is downscaled into a sixteen cell unit, the downscaled model still keeps the same values as the coarse model. The simple conventional approach can certainly maintain the data value consistency between the initial model and the downscaled model; however, the conventional downscaled model falls short in numerous regards, including: inability to capture the fine-scale heterogeneities, inability to preserve the continuity across the coarse grid areas, inability to quantify static property uncertainty and inability to condition to available fine-scale hard data.

Kriging with local varying mean (LVM) provides a channel for adding coarse-scale data into the kriging system hence into spatial estimators. This type technique is, for example, described in the following document:

Goovaerts, P., 1997, *"Geostatistics for Natural Resources Evaluation"*, Oxford University Press, New York, p. 496.

However, the coarse information is used only as an expected value replacing the local simple kriging (SK) stationary mean. Kriging with LVM can not reproduce the local mean, and hence cannot reproduce the coarse data value exactly.

The goal of block kriging is to estimate block values through weighted linear combinations of conditioning point data with the weights obtained by solving a block kriging system. Block kriging is similar to an upscaling process, as opposed to the inverse process of downscaling. This technique is, for example, described in the following documents:

Journel, A. and Huijbregts, C. J.: 1978, Mining Geostatistics, Academic Press, New York.

Isaaks, E. and Srivastava, R.: 1989, An introduction to applied geostatistics, Oxford University Press, New York.

A block sequential simulation (bssim) algorithm is currently utilized for integrating coarse-scale block average data of any shape (e.g., remove sensing or seismic travel-time tomographic data) with fine data. This technique is, for example, described in the following documents:

Liu, Y., 2007, *"Geostatistical integration of linear coarse-scale data and fine-scale data"*, PHD dissertation, Stanford University, California, p. 211.

Liu, Y. and Journel, A. G., 2009, *"A package for geostatistical integration of coarse and fine scale data"*, Computers & Geosciences, 35(3), 527-547.

Unfortunately, available computing power and time constraints limit the number of cells that may be practically utilized by geologic models. Thus, bssim is limited to downscaling small models that have less than 1000 coarse grid cells due to its excessive memory costs.

Therefore, a need exists for a practical downscaling algorithm for geological modeling to capture the fine-scale heterogeneities, to preserve the continuity across the coarse grid areas, to quantify static property uncertainty, and to condition to available coarse and fine-scale hard data, all while using the least amount of memory.

SUMMARY OF THE INVENTION

In an embodiment of the present invention, a computer-aided method of downscaling a three-dimensional geological model by generating numerical stochastic fine-scale models conditioning to data of different scales and capturing spatial uncertainties which involves a downscaling algorithm, the method includes: (a) generating a point covariance map, wherein the point covariance map is generated by obtaining point covariance values between a first base point and all points within an expanded area; (b) storing the point covariance map, wherein the point covariance map is stored based on covariance symmetry, wherein about half of the point covariance map is stored; (c) generating a block-to-point covariance map, wherein the block-to-point covariance map is generated by obtaining block-to-point covariance values between a first base block and all points within the expanded area; (d) storing the block-to-point covariance map, wherein the block-to-point covariance map is stored based on covariance symmetry, wherein about half of the block-to-point covariance map is stored; (e) calculating block-to-block covariance values, wherein the block-to-block covariance values are generated by obtaining the block-to-block covariance values between a first base block and a second block, wherein the block-to-block covariance values are obtained from the stored block-to-point covariance map, wherein the block-to-block covariance values are calculated by averaging the block-to-point covariance values covered by a second block; (f) storing the block-to-block covariance values; (g) randomly selecting a first simulation node within the defined simulation area; (h) utilizing the stored point and block-to-point covariance maps to search and retrieve neighboring point covariance values and neighboring block-to-point covariance values around the simulation node; (i) constructing a kriging system, wherein the constructed kriging system is based on the retrieved point and block-to-point covariance values and the calculated block-to-block covariance; (j) solving the kriging system; (k) computing the kriging mean and the kriging variance; (l) defining a sampling interval based on the calculated local kriging mean and variance; (m) simulating a value by randomly drawing a value from the kriging mean and variance defined interval in a global target cumulative distribution; (n) assigning the simulation value to a simulation location; and (o) repeating steps (h) through (n) until all nodes within the defined area have been simulated.

In another embodiment of the present invention, a computer-aided method of downscaling a three-dimensional geological model by generating numerical stochastic fine-scale models conditioning to data of different scales and capturing spatial uncertainties which involves a downscaling algorithm, the method includes: (a) generating a point covariance map; (b) storing the point covariance map; (c) generating a block-to-point covariance map; (d) storing the block-to-point covariance map; (e) calculating block-to-block covariance values; (f) storing the block-to-block covariance values; (g) randomly selecting a first simulation node within the defined simulation area; (h) utilizing the stored point and block-to-point covariance maps to search and retrieve neighboring point covariance values and neighboring block-to-point covariance values around the simulation node; (i) constructing a kriging system; (j) solving the kriging system; (k) computing the kriging mean and the kriging variance; (l) defining a sampling interval based on the calculated local kriging mean and variance; (m) simulating a value by randomly drawing a value from the kriging mean and variance defined interval in a global target cumulative distribution; (n) assigning the simulation value to a simulation location; and (o) repeating steps (h) through (n) until all nodes within defined area have been simulated.

BRIEF DESCRIPTION OF THE DRAWINGS

The invention, together with further advantages thereof, may best be understood by reference to the following description taken in conjunction with the accompanying drawings in which:

FIG. 2 is a simulation workflow in accordance with an embodiment of the present invention.

FIG. 4 is a block covariance map in accordance with the present invention.

FIG. 6 is a block-to-point covariance map in accordance with the present invention.

DETAILED DESCRIPTION OF THE INVENTION

Figure 1:
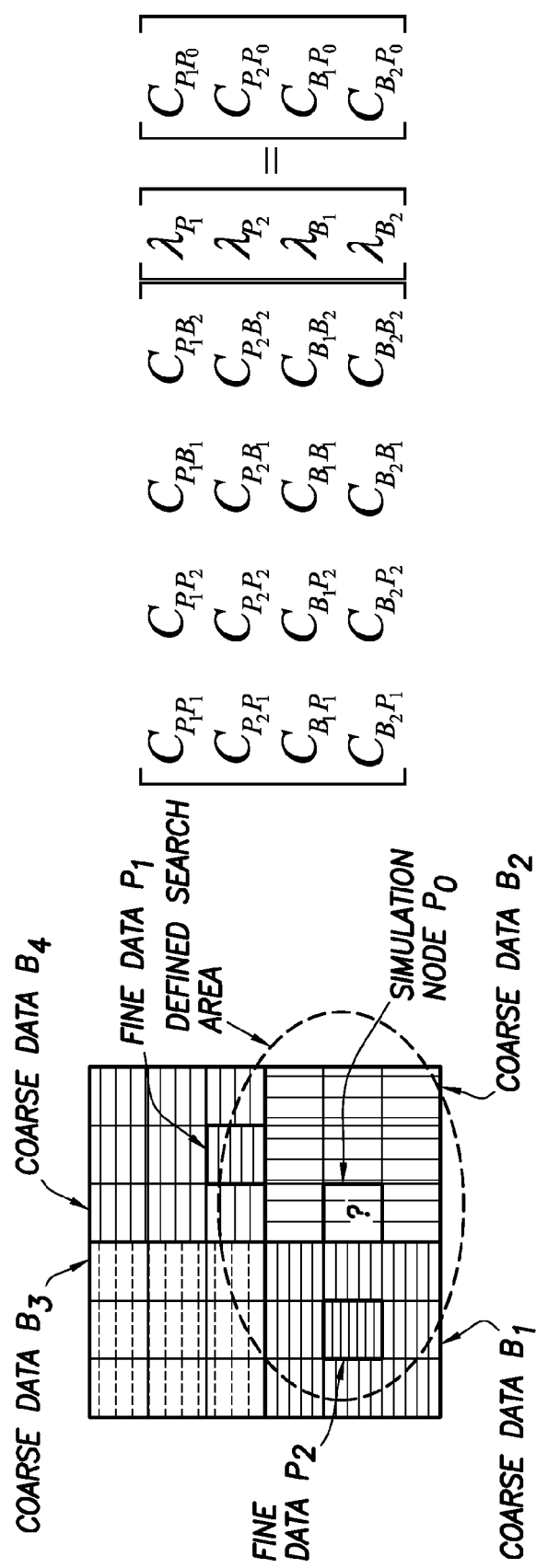
FIG. 1 is a schematic of data in a defined search area and the corresponding kriging system in accordance with an embodiment of the present invention.

Reference will now be made in detail to embodiments of the present invention, one or more examples of which are illustrated in the accompanying drawings. Each example is provided by way of explanation of the invention, not as a limitation of the invention. It will be apparent to those skilled in the art that various modifications and variations can be made in the present invention without departing from the scope or spirit of the invention. For instance, features illustrated or described as part of one embodiment can be used on another embodiment to yield a still further embodiment. Thus, it is intended that the present invention cover such modifications and variations that come within the scope of the appended claims and their equivalents.

In petroleum and other earth science applications, one often needs to account for a large variety of data with different support volumes carrying information at different scales. The coarse scale data, such as seismic travel time, well-test effective permeability, or streamline data, are henceforth referred to as "block" data. The block data are average values, not necessarily linear, over their respective support volumes. The fine scale data, such as well data or core data, henceforth referred to as "point" data. Mapping or numerical modeling requires incorporation of all relevant information from the data with different scales.

The present invention provides a downscale simulation algorithm (henceforth referred to as downsim), which can stochastically rescale the model from coarse scale to fine scale, while honoring the input coarse scale block data and fine scale point data. The block data B(v) is defined as the spatial linear average of point values P(u) over the coarse scale data location (Journel and Huijbregts, 1978; Liu, 2007):

$$B(v) = \frac{1}{|v|} \int_v P(u) du \ (u \in v) \quad (1)$$

where v denotes the block location and |v| denotes the block volume. In the discrete form, assuming equal weights for all fine cells, it can be written as:

$$B_j = \frac{1}{n_j} \sum_{i=1}^{n_j} P(u_i) \quad (2)$$

where $n_j$ is the number of fine data grids within the coarse data $B_j$. This equation means that the coarse datum is an arithmetic average of all fine scale data within that coarse scale data grid. The fine scale data can potentially have different weights. If the data are non-linear, they can be transformed into a linear space before this algorithm is applied.

In order to integrate data of different scales, both block and point data must be considered simultaneously in the kriging system. Both simple kriging (SK) and ordinary kriging (OK) can be used in this algorithm. For simplicity, the kriging theory is recalled here with simple kriging (SK). The simple kriging (SK) estimator $P^*_{OK}(u)$ conditioned to both point and block data is written as:

$$P^*_{SK}(u) - m_0(u) = \quad (3)$$

$$\sum_{\alpha=1}^{n_P(u)} \lambda_{P_\alpha}(u) \times (P(u_\alpha) - m_P(u_\alpha)) + \sum_{\beta=1}^{n_B(u)} \lambda_{B_\beta}(u) \times (B(v_\beta) - m_B(v_\beta))$$

where $P(u_\alpha)$ is the fine scale data within the defined search area, e.g., $P_1$ and $P_2$ in FIG. 1; $\lambda_{P_\alpha}(u)$ is the corresponding kriging weight of fine scale data; $B(u_\beta)$ is the coarse scale data within the defined search area, e.g., $B_1$ and $B_2$ in FIG. 1; $\lambda_{B_\beta}(u)$ is the corresponding kriging weight of coarse scale data; $m_0(u)$ is the expected value of random variable P(u); $m_P(u_\alpha)$ is the expected value of fine scale data random variable $P(u_\alpha)$; $m_B(v_\beta)$ is the expected value of coarse scale data random variable $B(v_\beta)$; $n_P(u)$ is the number of fine scale data within the defined search area; $n_B(u)$ is the number of coarse scale data within the defined search area.

The simple kriging weights $\lambda_\alpha$ and $\lambda_\beta$ can be obtained through the kriging system:

$$\begin{bmatrix} C_{P_1P_1} & C_{P_1P_2} & \cdots & C_{P_1P_{np}} & C_{P_1B_1} & C_{P_1B_2} & \cdots & C_{P_1B_{n_B}} \\ C_{P_2P_1} & C_{P_2P_2} & \cdots & C_{P_2P_{np}} & C_{P_2B_1} & C_{P_2B_2} & \cdots & C_{P_2B_{n_B}} \\ \vdots & \vdots & \ddots & \vdots & \vdots & \vdots & \ddots & \vdots \\ C_{P_{np}P_1} & C_{P_{np}P_2} & \cdots & C_{P_{np}P_{np}} & C_{P_{np}B_1} & C_{P_{np}B_2} & \cdots & C_{P_{np}B_{n_B}} \\ C_{B_1P_1} & C_{B_1P_2} & \cdots & C_{B_1P_{np}} & C_{B_1B_1} & C_{B_1B_2} & \cdots & C_{B_1B_{n_B}} \\ C_{B_2P_1} & C_{B_2P_2} & \cdots & C_{B_2P_{np}} & C_{B_2B_1} & C_{B_2B_2} & \cdots & C_{B_2B_{n_B}} \\ \vdots & \vdots & \ddots & \vdots & \vdots & \vdots & \ddots & \vdots \\ C_{B_{n_B}P_1} & C_{B_{n_B}P_{np}} & \cdots & C_{B_{n_B}P_{np}} & C_{B_{n_B}B_1} & C_{B_{n_B}B_2} & \cdots & C_{B_{n_B}B_{n_B}} \end{bmatrix} \begin{bmatrix} \lambda_{P_1} \\ \lambda_{P_2} \\ \vdots \\ \lambda_{P_{np}} \\ \lambda_{B_1} \\ \lambda_{B_2} \\ \vdots \\ \lambda_{B_{n_B}} \end{bmatrix} = \begin{bmatrix} C_{P_1P_0} \\ C_{P_2P_0} \\ \vdots \\ C_{P_{u_p}P_0} \\ C_{B_1P_0} \\ C_{B_2P_0} \\ \vdots \\ C_{B_{n_B}P_0} \end{bmatrix} \quad (4)$$

where $C_{P_iP_j}$ is the covariance between fine scale data $P_i$ and $P_j$; $C_{B_iB_j}$ is the covariance between coarse scale data $B_i$ and $B_j$; $P_0$ is the simulation node, e.g., as shown in FIG. 1. For the case in FIG. 1, two fine scale data points and two coarse scale data points are found in the given defined search area. The corresponding covariance system is given in FIG. 1.

The simple kriging variance is calculated with:

$$\sigma_{SK}^{*}(u) = C(0) - \sum_{\alpha=1}^{n_P(u)} \lambda_{P_\alpha}(u) \times C(u_\alpha - u) - \sum_{\beta=1}^{n_B(u)} \lambda_{B_\beta}(u) \times C(v_\beta - u) \quad (5)$$

where $P^*_{SK}(u)$ represents the kriging mean and $\sigma^*_{SK}(u)$ represents the variance, must be calculated for each simulation node to evaluate the local conditional probability distribution.

Conventionally, covariance values are calculated for a given model as needed. However, to improve the kriging system construction efficiency, all possible covariance values are calculated and stored in the form of covariance maps prior to modeling. The covariance values are then retrieved from the covariance maps as needed.

Figure 3A:
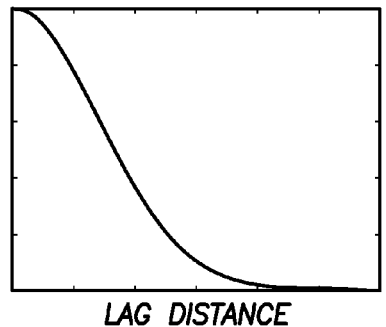
FIG. 3 is a point covariance map in accordance with the present invention.
Figure 3B:
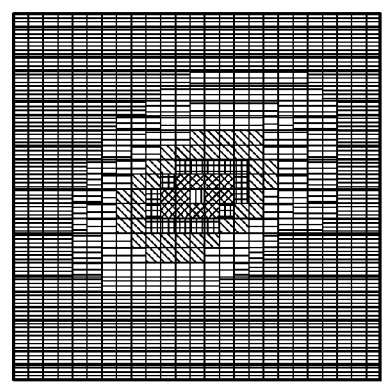
Figure 3C:
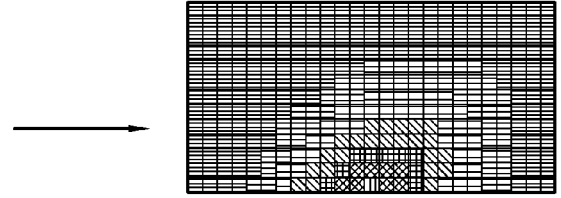
Figure 3D:
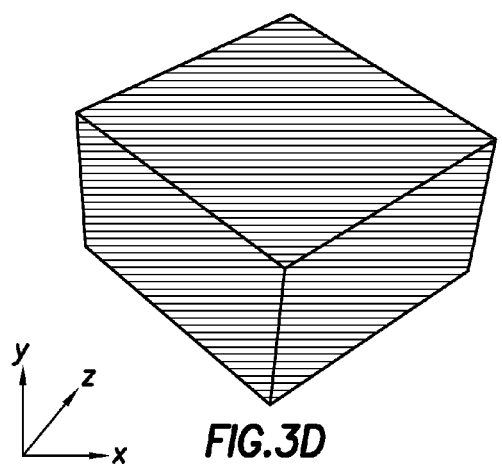
Figure 3E:
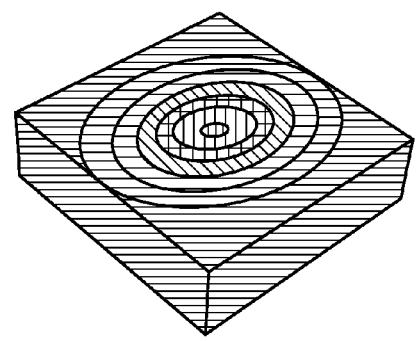

In geostatistical modeling, the way to handle heterogeneity is through a regionalized variable parameterization by the variogram or covariance. Referring to FIG. 3A, a covariance curve with varying spatial separation distance (lag distance) is provided in one direction. The spatial correlation decreases as the lag distance increases. If the covariance curves are plotted in all directions on a two dimensional plane, a covariance map is created similar to that in FIG. 3B. Similarly, a covariance cube can be generated in a three dimensions as shown in FIG. 3D. Referring to FIG. 3C, the covariance map size is about two times larger than the defined study area of interest in the x, y and z direction in order to include all omni-directional covariance values needed in the kriging system. However, the covariance map size can be significantly reduced according to the symmetric property of covariance:

$$\text{Cov}(u_0, u(x,y,z)) = \text{Cov}(u_0, u(-x,-y,-z)) \quad (6)$$

where Cov denotes covariance; $u_0$ denotes the origin of variogram lag distance and $u(x, y, z)$ is the end of the variogram lag. The equation indicates that the covariance map is central symmetric. A covariance map can be fully represented by about half of itself, as shown in FIG. 3C and FIG. 3E. In downsim, only about half of the covariance map is stored.

Like other geostatistical algorithms, downsim performs simulation in Cartesian grids instead of real stratigraphical grids. All coarse scale data can be assumed to have the same size and shape in the Cartesian grid system. However, in the present invention the number of block covariance maps can be reduced from the number of coarse grid cells in bssim to one, which significantly alleviates the burden of memory requirement.

Figure 7:
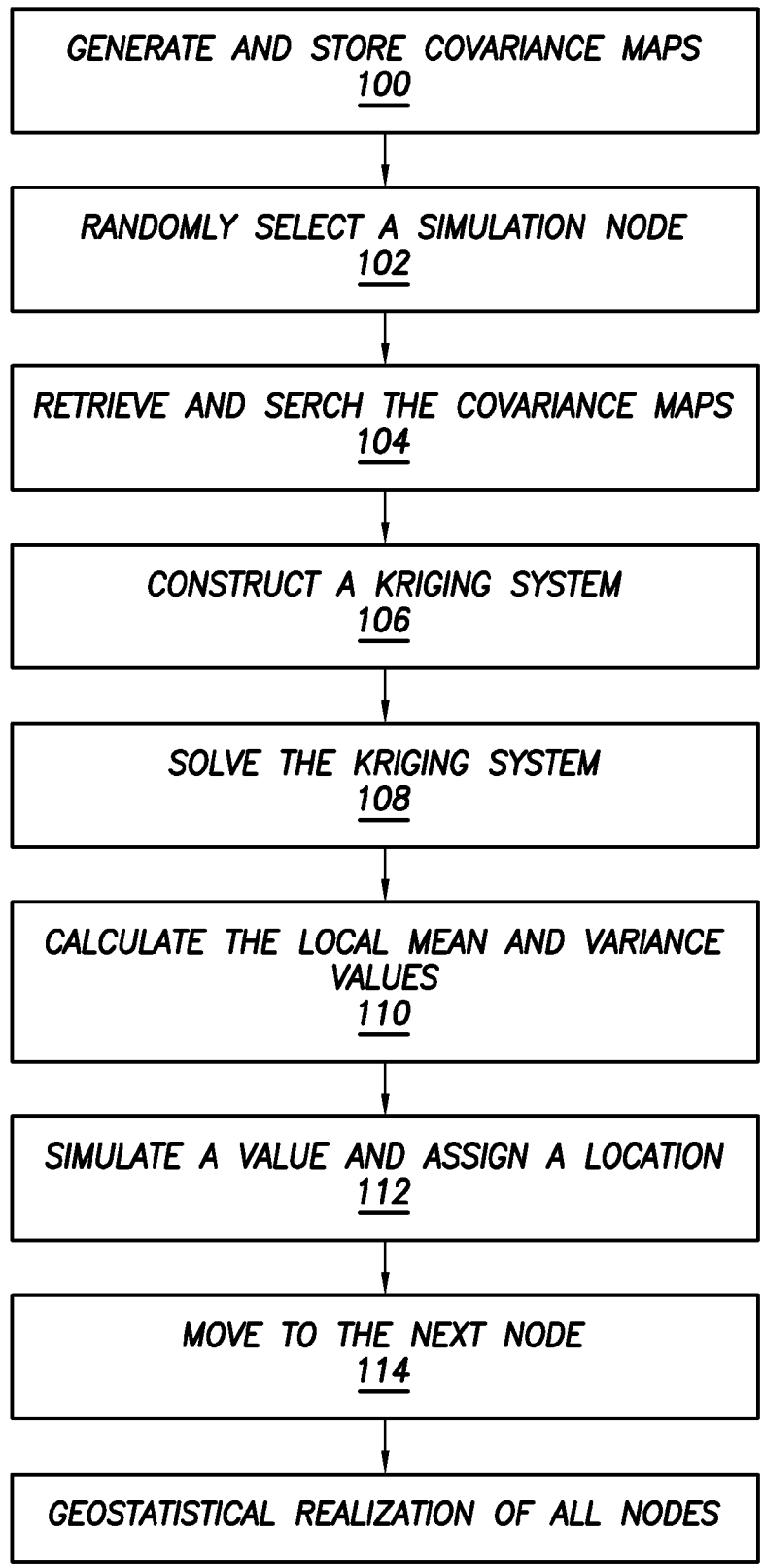
FIG. 7 is a flow diagram in accordance with the present invention.

A flow chart of steps may be utilized by embodiments of the present invention illustrated in FIG. 7. Some of the blocks of the flow chart may represent a code segment or other portion of the computer program. In some alternative implementations, the functions noted in the various blocks may occur out of the order depicted in FIG. 7. For example, two blocks shown in succession in FIG. 7 may in fact be executed substantially concurrently, or the blocks may sometimes be executed in the reverse order depending upon the functionality involved.

In step 100, covariance maps are generated and stored. Prior to commencing simulation, the point and block-to-point covariance maps, as shown in FIG. 2B, are generated and stored once for all subsequent simulations and realizations.

The point covariance map is generated by calculating point covariance values between a first base point and all points within the expanded area. For example, FIG. 3B provides a two-dimensional point covariance map and FIG. 3D provides a three-dimensional covariance map.

The block-to-point covariance map is generated by calculating the block-to-point covariance values between a first base block and all points within the expanded area. For example, FIG. 4B provides a first base block 200 within an expanded area 210. FIG. 4A depicts the block-to-point covariance map within the expanded area 210.

According to covariance symmetric properties, only approximately half of the original point and block-to-point covariance maps are retained in memory. As previously discussed, FIG. 3C is approximately half of the original two-dimensional point covariance map depicted in FIG. 3B. Likewise, FIG. 3E is approximately half of the original three-dimensional point covariance map depicted in FIG. 3C. Furthermore, covariance symmetry provides that only about half of the original block-to-point covariance map is retained in memory, as shown in FIG. 4C, which are the block-to-point covariance values between the first base block 200 of FIG. 4D and all points within the expanded area 210. The reduced point and block-to-point covariance maps are stored in the downsim algorithm.

In step 102, a simulation node is selected. The simulation is performed on a node by node basis, sequentially following a random path within the simulation area. For example, FIG. 2A depicts a simulation node u with neighboring fine-scaled and coarse-scale data.

In step 104, the previously stored point and block-to-point covariance maps are retrieved and searched. The point and block-to-point covariance maps are searched and the neighboring point and block-to-point covariance values surrounding the simulation node u are searched and retrieved.

Figures 5A, 5B:
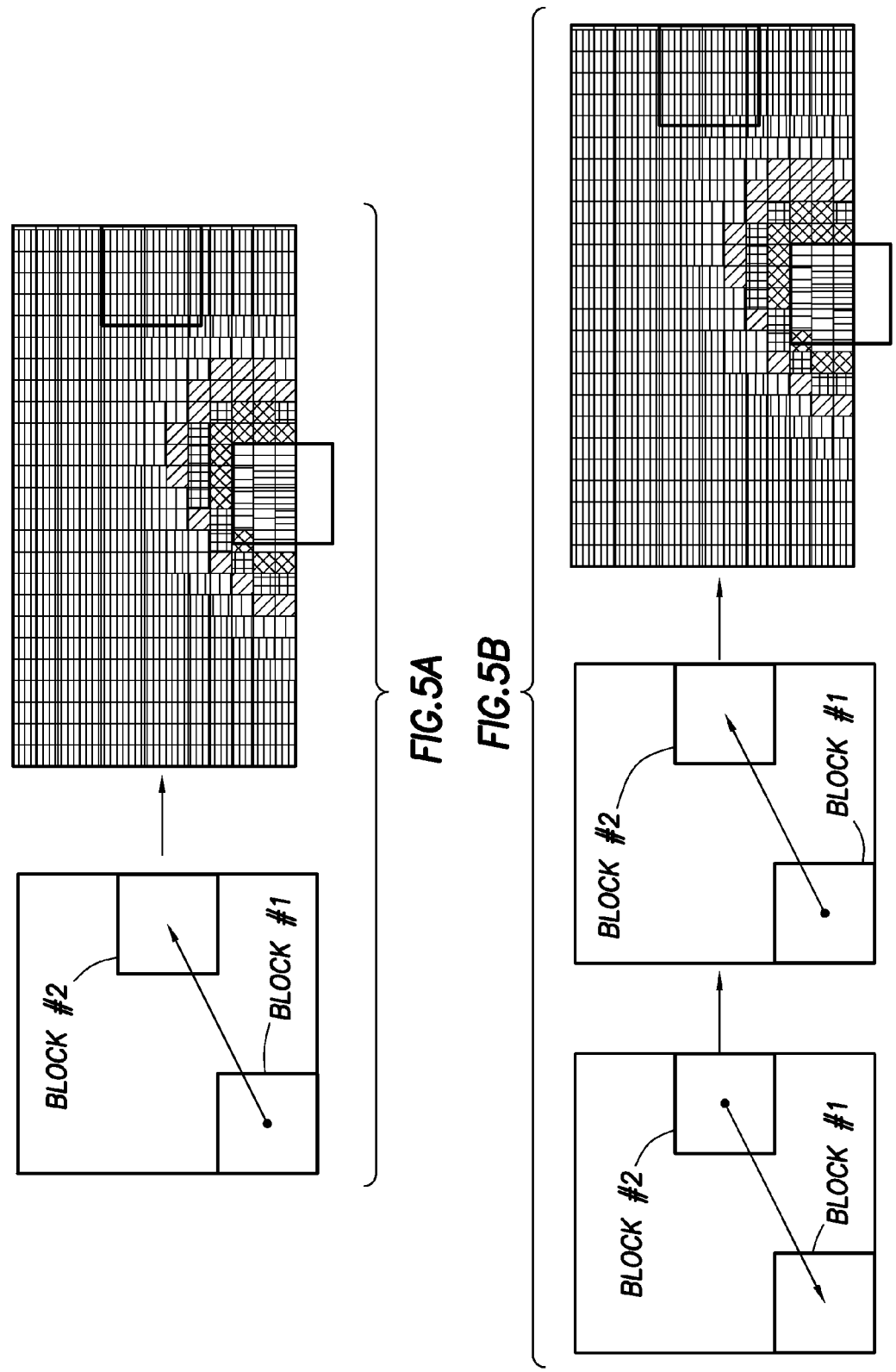
FIG. 5 is a block-to-block covariance map in accordance with the present invention.
Figures 5C, 5D:
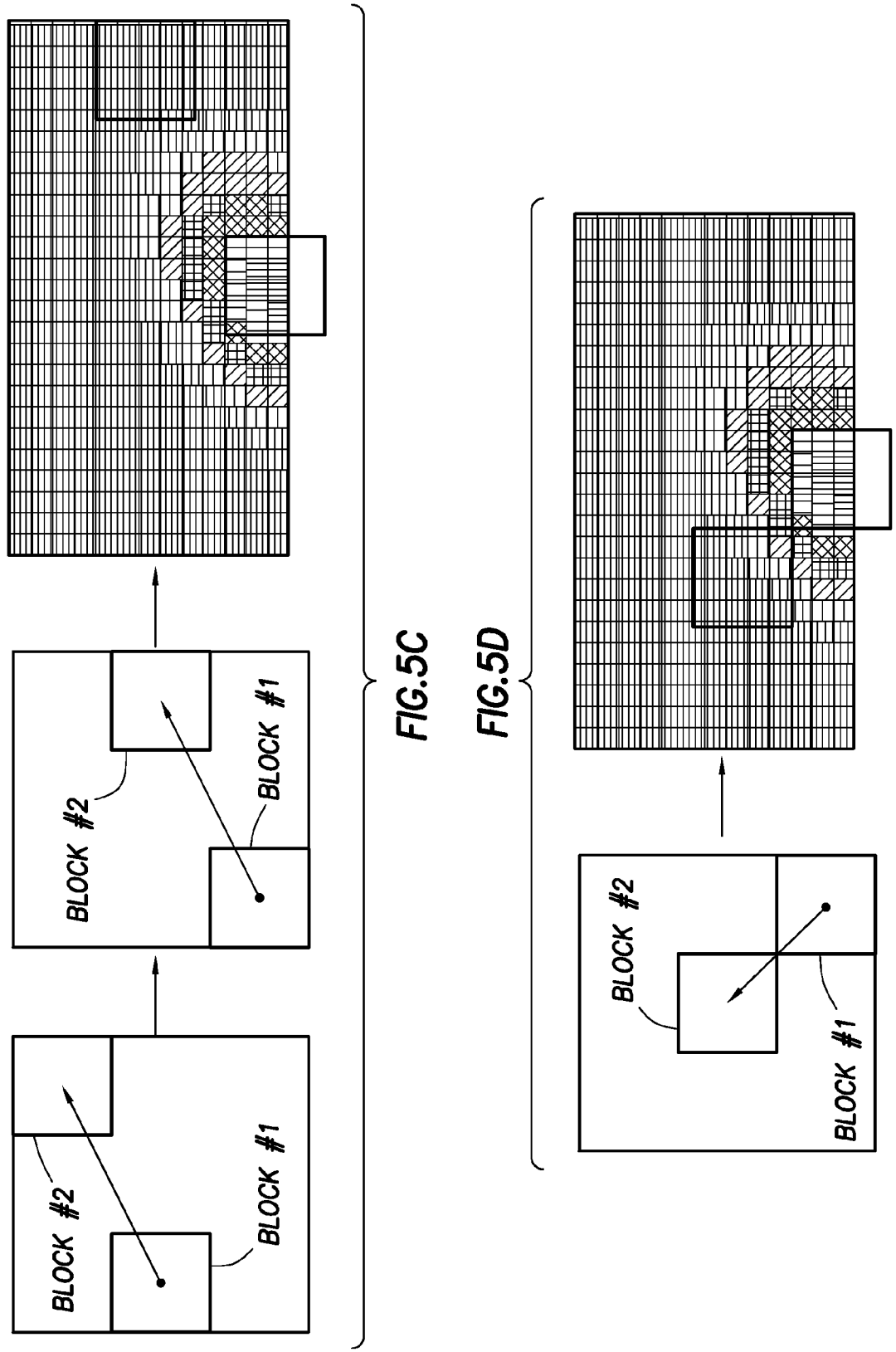
Figure 8:
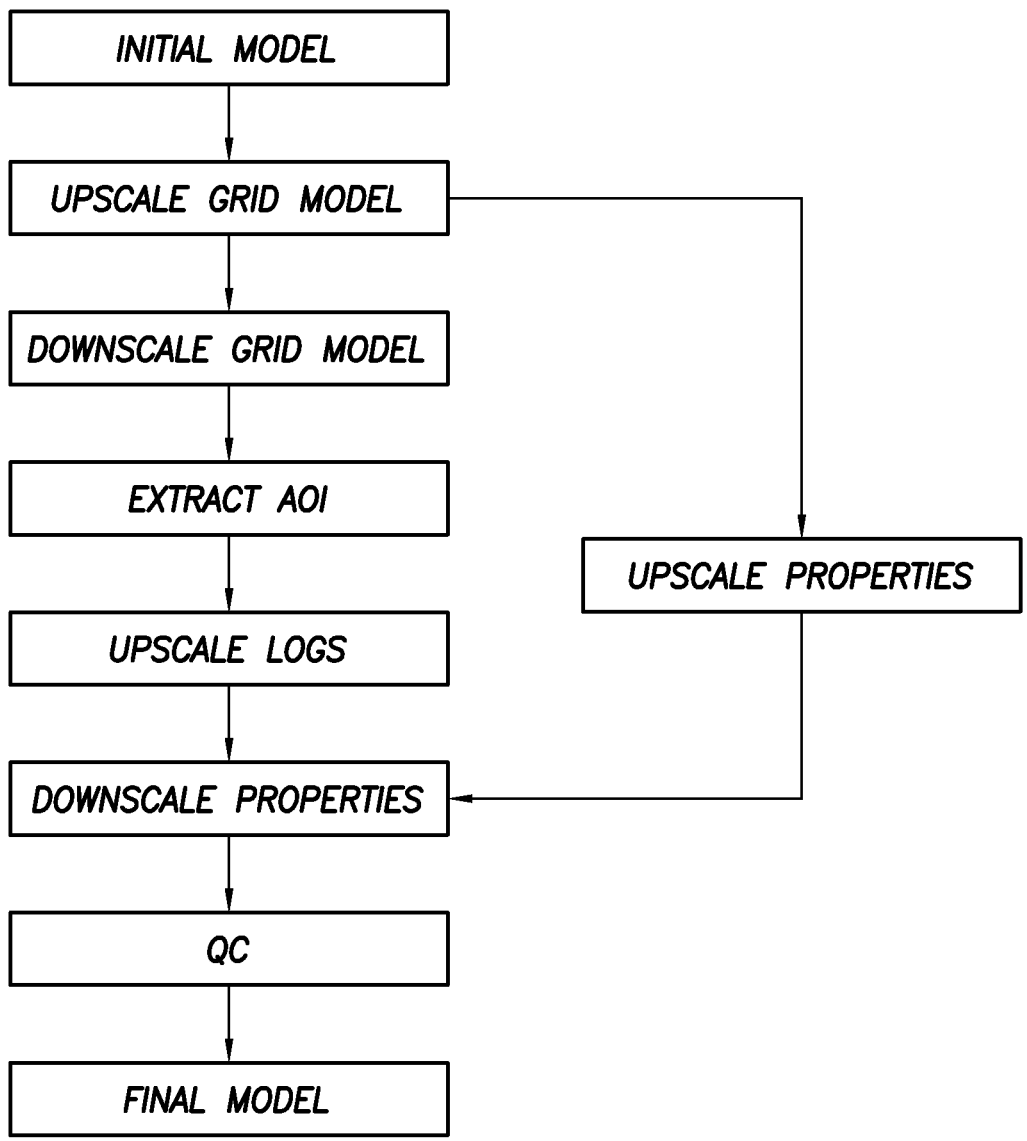
FIG. 8 is a SAGD geomodel rescaling workflow in accordance with the present invention.

Given the point and block-to-point covariance maps, the covariance value between the first base block and a second block, referred to as a block-to-block covariance, is obtained by calculating the average point covariance values over the area covered by the second block. FIG. 5 provides four different scenarios in which the location of the blocks affects the calculation approach. FIG. 8A provides the simplest scenario in which the location of the first base block, block #1, coincides with the base case in FIG. 4C. In FIG. 5A, the covariance values between block #1 and the block #2 is simply the average of the block-to-point covariance values over the location of the second block. In FIG. 5B, the covariance between block #1 and the block #2 has an opposite direction than depicted in FIG. 5A. According to the symmetric property of covariance, the covariance values in FIG. 5B are the same as the covariance values in FIG. 5A. Thus, the covariance values are obtained by calculating the average block-to-point covariance values over the area covered by the second block. In FIG. 5C, the location of block #1 is different from the base case in FIG. 4C. Thus, the two blocks are simultaneously shifted such that block #1 is moved to the base case block location as shown in FIG. 4C. The shifted blocks and the original blocks have the same block-to-block covariance value. This covariance value is obtained by calculating the average block-to-point covariance values over the area covered by the second block. Finally, in FIG. 5D the two blocks are aligned in a different orientation. The second block falls on the left side of the block-to-point covariance map. Similarly, the block-to-block covariance value is calculated by averaging the block-to-point covariance values within the second block.

Once the covariance value of the two blocks is computed, the covariance value is stored and can be directly retrieved for the block pairs with the same spatial configuration in subsequent simulation. All block-to-block covariance values required for stochastic simulation are able to be obtained from the single stored covariance map. As the simulation proceeds, a block-to-block lookup table is constructed, thus avoiding repeated calculations of block covariance with the same lag distances in the subsequent simulation.

Similar to the block-to-block covariance calculation, block-to-point covariance values can be retrieved from the stored block covariance map, as shown in FIG. 6. In many cases both shifting movements and symmetric transformations are needed in order to find the matched block-to-point pair configuration in the stored block-to-point covariance map.

Point covariance values can be retrieved from the point covariance map based on symmetric properties. Alternatively, the point covariance values can be calculated at each simulation location using the variogram equations. As opposed to block covariance, both approaches for point covariance are acceptable in terms of CPU efficiency because the real-time point covariance calculation is fast.

In step 106, a kriging system is constructed. Based on the retrieved point and block related covariance values, a local kriging system, as shown in FIG. 2C, is built:

$$\begin{bmatrix} C_{PP} & \overline{C}_{PB} \\ \overline{C}_{BP} & \overline{C}_{BB} \end{bmatrix} \begin{bmatrix} \lambda_P \\ \lambda_B \end{bmatrix} = \begin{bmatrix} C_{P_0P} \\ \overline{C}_{P_0B} \end{bmatrix} \quad (7)$$

The point covariance value ($C_{PP}$) and the block-related covariance values ($\overline{C}_{PB}$, $\overline{C}_{BP}$, $\overline{C}_{BB}$, $C_{P_0P}$, $\overline{C}_{P_0B}$) can be retrieved or calculated from the prebuilt point and block-to-point covariance maps (FIG. 2B) using the covariance search method as described in step 102.

In step 108, the kriging system is solved to obtain the kriging weights, $\lambda_P$ and $\lambda_B$.

In step 110, the local mean and variance values are calculated. The local mean and variance values are calculated with the standard kriging estimator and variance calculation equations. Since the simulation is performed in the original space, not in the Gaussian space as in sequential Gaussian simulation, the local distribution does not have to be in a Gaussian form. It can be of any type, including a user-defined histogram. To make the simulated model honor the global target histogram, one draws the simulated values within the target histogram interval defined by the local kriging mean and variance. Such technique is also described, for example, in the following document:

Soares, A., 2001, *"Direct sequential simulation and cosimulation"*, Mathematical Geology, p. 33, 911-926.

In step 112, a value is simulated and assigned to the location. A value is drawn from the sampling interval, of step 110, and assigned to the location u, see FIGS. 2E and 2F.

In step 114, move to the next node. Move to next node following a predefined random path, as shown in FIG. 2G, and repeat the process until all nodes are simulated resulting in a downscaled realization, as shown in FIG. 2H.

Finally, the random number is changed and a new-equally probably realization is generated by repeating the above workflow if user wants to build multiple models for uncertainty analysis.

In an embodiment, the method can be implemented as a plug-in. In another embodiment, the method can be implemented as a plug-in of a reservoir modeling software platform. In yet another embodiment, the method can be implemented as a plug-in of a reservoir modeling software platform such as Petrel™.

In an embodiment, the method can be applied to steam assisted gravity drainage (SAGD) geomodel downscaling.

Example

Geocellular models typically have grid cell resolution of tens or hundreds feet, and cover large areas. However, SAGD is conducted in relatively small areas and needs much finer grid cell dimensions (several feet) in the direction perpendicular to the horizontal wells to capture the steam chamber development process. Furthermore, it is neither reasonable nor practical to build many isolated small SAGD geomodels ignoring the regional geology and prebuilt coarser-scale geomodels. Downsim enables geomodelers to build fine-scale models for SAGD thermal simulation while maintaining the consistency between the SAGD models and the existing normal geomodels.

Referring to the SAGD geomodel resealing workflow in FIG. 11, both upscaling and downscaling are involved. To save thermal simulation time, the cells are upscaled in the horizontal well direction. And the cells are downscaled in the perpendicular direction. Appropriate upscaling methods can be used for different petrophysical properties. A thermal pilot area of interest (AOI) is then extracted from the resealed grid model. The initial well logs are re-blocked to the new grid, which will be used as hard data for downscaling.

Next, downscaling is performed with downsim. The downscaled property incorporates hard data information; has fine-scale variations within coarse grids; and smoothes the coarse grid boundary effects. Large scale features in the coarse model are preserved in the downscaled models, and sub-coarse-grid heterogeneities are also modeled. Those fine-scale property variations can have significant impacts on SAGD thermal simulation. For the quality control (QC) purpose, the reproductions of the input coarse porosity data, variogram and histogram, etc., need to be checked before the geomodel is finalized for thermal simulation.

This is a fast algorithm because of its novel block covariance map storage and retrieving methods. Many repeated CPU intensive block covariance calculations are saved.

This is a memory-efficient algorithm because all the block related covariance values can be computed from one single block-to-point covariance map. In bssim (Liu and Journel 2009), the block-to-point covariance map for each coarse block is stored, in which the memory cost increases dramatically as the number of blocks increases.

This algorithm makes the previously CPU and memory prohibitive downscaling process become practical.

Methods consistent with the present teachings are especially well-suited for implementation by a computing element. The computer may be part of a computer network that includes one or more clients computers and one or more server computers interconnected via a communications system such as an intranet or the internet. It will be appreciated, however, that the principles of the present invention are useful independently of a particular implementation, and that one or more of the steps described herein may be implemented without the assistance of the computing device or with the assistance of a plurality of computing devices.

The present invention can be implemented in hardware, software, firmware, and/or combinations thereof. In a preferred embodiment, however, the invention is implemented with a computer program. The computer program and equipment described herein are merely examples of program and equipment that may be used to implement the present invention and may be replaced with other software and computing devises without departing from the scope of the present teachings.

Computer programs consistent with the present teachings can be stored in or on a computer-readable medium residing on or accessible by the computer for instructing the computer to implement methods as described herein. The computer program preferably comprises a plurality of code segments corresponding to executable instructions for implementing logical functions in the computer and other computing devices coupled with the computer. The computer program can be embodied in any computer-readable medium for use by or in connection with an instruction execution system, apparatus, or device, such as a computer-based system, processor-containing system, or other system that can fetch the instructions from the instruction execution system, apparatus, or device, and execute the instructions.

It will be understood by persons of ordinary skill in the art that the program may comprise a single list of executable instructions or two or more separate lists, and may be stored on a single computer-readable medium or multiple distinct media.

In the context of this application, a "computer-readable medium" can be any means that can contain, store, communicate, propagate or transport the program for use by or in connection with the instruction execution system, apparatus, or device. The computer-readable medium can be, for example, but not limited to, an electronic, magnetic, optical, electro-magnetic, infrared, or semi-conductor system, apparatus, device, or propagation medium. More specific, although not inclusive, examples of the computer-readable medium would include the following: an electrical connection having one or more wires, a portable computer diskette, a random access memory (RAM), a read-only memory (ROM), an erasable, programmable, read-only memory (EPROM or Flash memory), an optical fiber, and a portable compact disc (CD) or a digital video disc (DVD). The computer-readable medium could even be paper or another suitable medium upon which the program is printed, as the program can be electronically captured, via for instance, optical scanning of the paper or other medium, then compiled, interpreted, or otherwise processed in a suitable manner, if necessary, and then stored in a computer memory.

The preferred embodiment of the present invention has been disclosed and illustrated. However, the invention is intended to be as broad as defined in the claims below. Those skilled in the art may be able to study the preferred embodiments and identify other ways to practice the invention that are not exactly as described in the present invention. It is the intent of the inventors that variations and equivalents of the invention are within the scope of the claims below and the description, abstract and drawings not to be used to limit the scope of the invention.

The invention claimed is:

1. A computer-aided method of downscaling a three-dimensional geological model by generating numerical stochastic fine-scale models conditioning to data of different scales and capturing spatial uncertainties which involves a downscaling algorithm, the method comprising:
   a. generating a point covariance map, wherein the point covariance map is generated by obtaining point covariance values between a first base point and all points within an expanded area;
   b. storing the point covariance map, wherein the point covariance map is stored based on covariance symmetry, wherein essentially half of the point covariance map is stored;
   c. generating a single block-to-point covariance map, wherein the block-to-point covariance map is generated by obtaining block-to-point covariance values between a first base block and all points within the expanded area;
   d. storing the single block-to-point covariance map, wherein the block-to-point covariance map is stored based on covariance symmetry, wherein essentially half of the block-to-point covariance map is stored;
   e. calculating block-to-block covariance values, wherein the block-to-block covariance values are generated by obtaining the block-to-block covariance variance values between a first base block and a second block, wherein the block-to-block covariance values are obtained from the stored block-to-point covariance map, wherein the block-to-block covariance values are calculated by averaging the block-to-point covariance values covered by a second block;
   f. storing the block-to-block covariance values;
   g. randomly selecting a first simulation node within a defined simulation area;
   h. utilizing the stored point and block-to-point covariance maps to search and retrieve neighboring point covariance values and neighboring block-to-point covariance values around a simulation node;
  i. constructing a kriging system, wherein the constructed kriging system is based on the retrieved point and block-to-point covariance values and calculated block-to-block covariance;
  j. solving the kriging system;
  k. calculating local kriging mean and variance;
  l. defining a sampling interval based on the calculated local kriging mean and variance;
  m. simulating a value by randomly drawing a value from the kriging mean and variance defined interval in a global target cumulative distribution;
  n. assigning the simulation value to a simulation location; and
  o. repeating steps (h) through (n) until all nodes within defined area have been simulated.

2. The method according to claim 1, wherein step (e) the block to block covariance, wherein the block-to-block covariance is determined by computing the covariance values between the first base block and a second block.

3. The method according to claim 2, wherein the covariance values between the first base block and the second block are computed by averaging the point covariance values over the area covered by the second block.

4. A computer-aided method of downscaling a three-dimensional geological model by generating numerical stochastic fine-scale models conditioning to data of different scales and capturing spatial uncertainties which involves a downscaling algorithm, the method comprising:
  a. generating a point covariance map;
  b. storing the point covariance map;
  c. generating a block-to-point covariance map;
  d. storing the block-to-point covariance map;
  e. calculating block-to-block covariance values;
  f. storing the block-to-block covariance values;
  g. randomly selecting a simulation node within a defined simulation area;
  h. utilizing the stored point and block-to-point covariance maps to search and retrieve neighboring point covariance values and neighboring block-to-point covariance values around the simulation node;
  i. constructing a kriging system;
  j. solving the kriging system;
  k. calculating local kriging mean and variance;
  l. defining a sampling interval based on calculated local kriging mean and variance;
  m. simulating a value by randomly drawing a value from the kriging mean and variance defined interval in a global target cumulative distribution;
  n. assigning the simulation value to a simulation location; and
  o. repeating steps (h) through (n) until all nodes within defined area have been simulated.

5. The method according to claim 4, wherein the point covariance map is generated by obtaining point covariance values between a first base point and all points within an expanded area.

6. The method according to claim 4, wherein the point covariance map is stored based on covariance symmetry.

7. The method according to claim 4, wherein essentially half of the point covariance map is stored.

8. The method according to claim 4, wherein the block-to-point covariance map is generated by obtaining block-to-point covariance values between a first base block and all points within an expanded area.

9. The method according to claim 4, wherein the block-to-point covariance map is stored based on covariance symmetry.

10. The method according to claim 4, wherein essentially half of the block-to-point covariance map is stored.

11. The method according to claim 4, wherein the block-to-block covariance values are generated by obtaining the block-to-block covariance values between a first base block and a second block.

12. The method according to claim 4, wherein the block-to-block covariance values are obtained from the stored block-to-point covariance map.

13. The method according to claim 4, wherein the block-to-block covariance values are calculated by averaging the block-to-point covariance values covered by a second block.

14. The method according to claim 4, wherein the constructed kriging system is based on the retrieved point and block covariance values.

15. The method according to claim 4, wherein all block-to-block covariance values are computed and retrieved from the single block-to-point covariance map.

16. The method according to claim 4, wherein the method is applied as a plug-in.

* * * * *